June 23, 1959 — R. L. KITRELL — 2,892,070
WELDING APPARATUS
Filed May 7, 1958 — 2 Sheets-Sheet 2

R. L. Kitrell
INVENTOR.
BY Robert J. Patin
ATTY

United States Patent Office 2,892,070
Patented June 23, 1959

2,892,070
WELDING APPARATUS
R. L. Kitrell, Tulsa, Okla.
Application May 7, 1958, Serial No. 733,634
8 Claims. (Cl. 219—125)

The present invention relates to welding apparatus, and more particularly to welding apparatus adapted to form non-horizontal welds and having provision for covering the molten weld with a dam to retain the molten material in place in the weld until the melt solidifies, and also to such apparatus for use in connection with inert-gas-shielded electric welding.

In the assembly of great lengths of pipe such as pipe lines, it is customary to assemble the pipe line from a plurality of relatively short pipe sections laid end to end. The contiguous ends of each adjacent pair of sections are beveled and butt welded. Since the work cannot be rotated, the welding operation requires welding from literally every angle from straight down to straight overhead.

In the past, it has been customary to reduce the amount of welding that must be done in the ditch of a pipe line by welding together two lengths of pipe while they are still on the surface of the ground, a procedure known in this art as "double-jointing." The double-joint is then lowered into the ditch and welded to that portion of the pipe line which has already been laid. It has been necessary for welders to get down into the ditch to work. Naturally, the ditches are not dug much larger than is necessary, so that the welder has been forced into dangerously close contact with his work. The difficulties and dangers of welding in such confined quarters will be especially clear when it is realized that a large portion of each weld is overhead or vertical work, with the result that there is a good deal of dripping and spatter.

In addition to the dangers involved, it will also be realized that the loss of so much metal from the weld inevitably leaves a weld which is undesirably weak. Furthermore, the irregularities in the weld introduced by such loss of weld metal set up points of galvanic action after the weld has been buried, and this results in excessive localized corrosion.

In addition to the difficulties inherent in non-horizontal welding, certain other difficulties attend the welding operation in any position. The welding operation in its broadest aspect is a procedure by which metals are temporarily subjected to extremely high temperature and in part attain a molten, extremely fluent condition. This leads to oxidation by contact with air and weld metal contamination with the rapid migration of impurities, so that the finished weld may be weak and adhere poorly to the base. In an effort to purify the weld metal and prevent contact with the air, various fluxes have been proposed which would purify the weld metal and form a protective layer of slag thereon. Unfortunately, however, the presence of a layer of slag on the weld to some extent prevents the forming or molding of the weld to a cross-sectional configuration having the greatest strength characteristics; and also, the slag must later be cleaned or chipped away from the weld.

Hence, recourse has been had to inert-gas-shielded welding, in which a stream of inert gas such as helium or argon or a mixture of both is played about the arc to exclude air and prevent weld metal contamination so that no flux is needed. It is the continuous supply of inert gas adjacent the arc that eliminates the air; and therein lies a weakness of the prior art practice in connection with shielding gas, for the use of a substantial quantity of this gas has heretofore been needed adequately to expel the air from the vicinity of the arc. The inert gas is fairly expensive, and if an attempt is made to reduce the quantity used by cutting the flow thereof about the arc, air will infiltrate the weld area to an undesirably high degree. On the other hand, if adequate inert gas is supplied, the cost is proportionately high.

Although many attempts have been made to overcome the foregoing and other difficulties and disadvantages of the prior art in this area, none, as far as is known, was entirely successful when practiced commercially on an industrial scale.

Accordingly, it is an object of the present invention to provide apparatus for welding joints between contiguous members, which is adapted to prevent the loss of molten metal from the weld.

Another object of the present invention is the provision of apparatus for welding joints between contiguous members, in which the apparatus automatically accommodates to irregularities in the members to be welded.

Still another object of the present invention is the provision of apparatus for welding joints between contiguous aligned cylindrical pipe sections, which is adapted to weld in either direction about the pipe sections.

A further object of the present invention is the provision of apparatus for welding joints between contiguous members, in which provision is made for shielding the welding area against air by the use of a minimum quantity of inert gas.

Finally, it is an object of the present invention to provide apparatus for welding joints between contiguous members, which will be relatively simple and inexpensive to manufacture, easy to adjust and to operate at high speeds, and safe, rugged and durable in use.

Broadly, the present invention solves the problems of the prior art in this field by providing apparatus for welding joints between contiguous members, in which a welding device is mounted on a carriage for movement along the joint to be welded, and a dam is provided to shape and form the weld and retain the weld metal in place until it solidifies. That same dam also serves as a shield beneath which an inert gas is introduced to exclude air by the use of a minimum quantity of inert gas. The dam and the shield are embodied in a single shoe.

Other objects, features and advantages of the present invention will become apparent from a consideration of the following description, taken in connection with the accompanying drawings, in which:

Figure 4 is a section viewed on the line 4—4 of Figure 2;

Figure 5 is a section viewed on the line 5—5 of Figure 4; and

Figure 1:
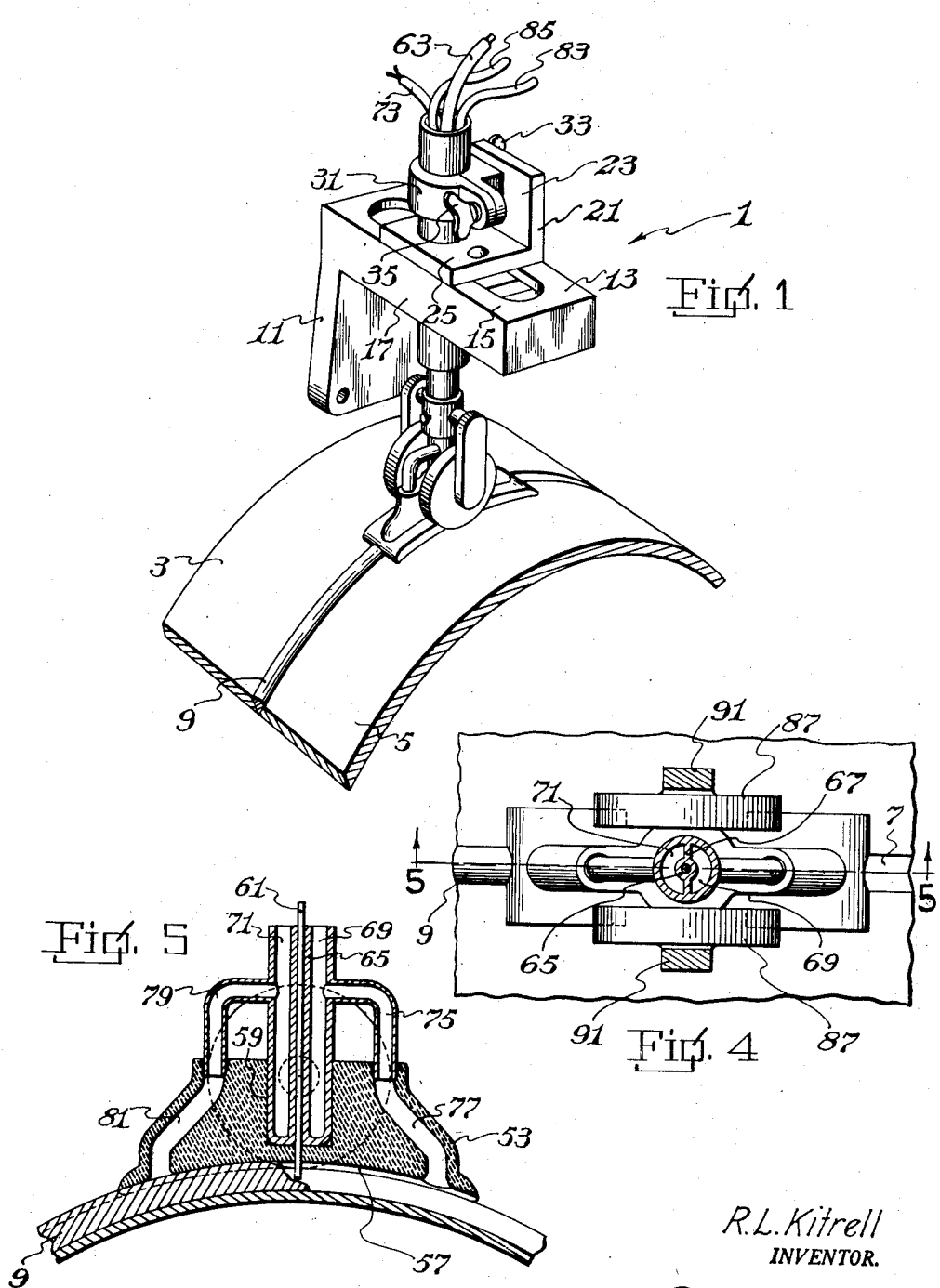
Figure 1 is a fragmentary perspective view of apparatus according to the present invention, showing the same in use in connection with a pipe line.
Figure 2:
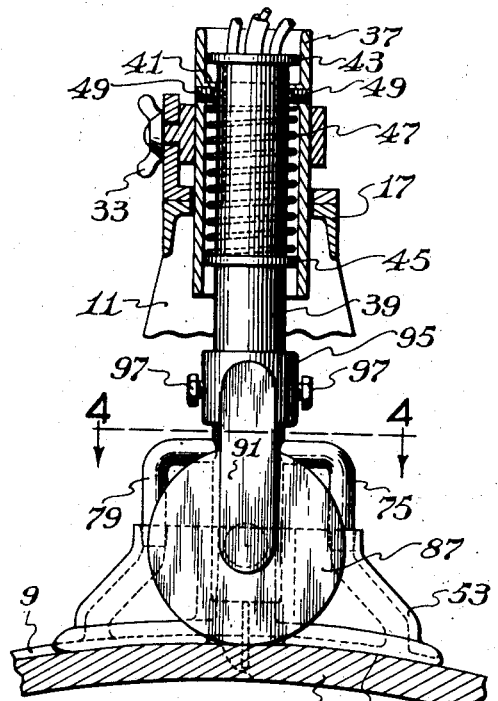
Figure 2 is an enlarged fragmentary elevational view of the structure of Figure 1, with parts broken away and viewed axially of the pipe sections.
Figure 3:
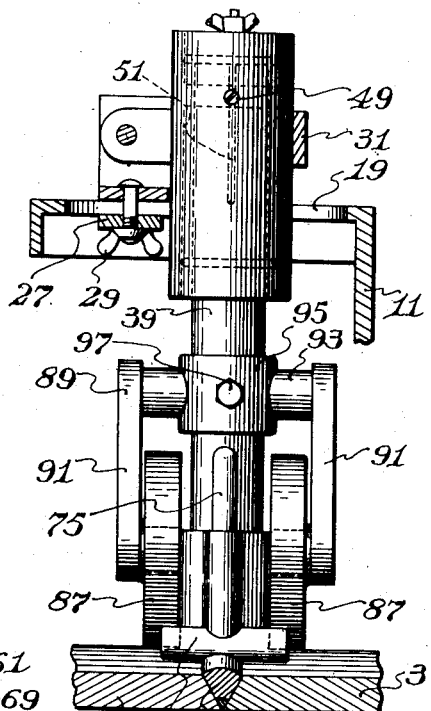
Figure 3 is a view similar to Figure 2 but viewed tangentially of the pipe sections.
Figure 6:
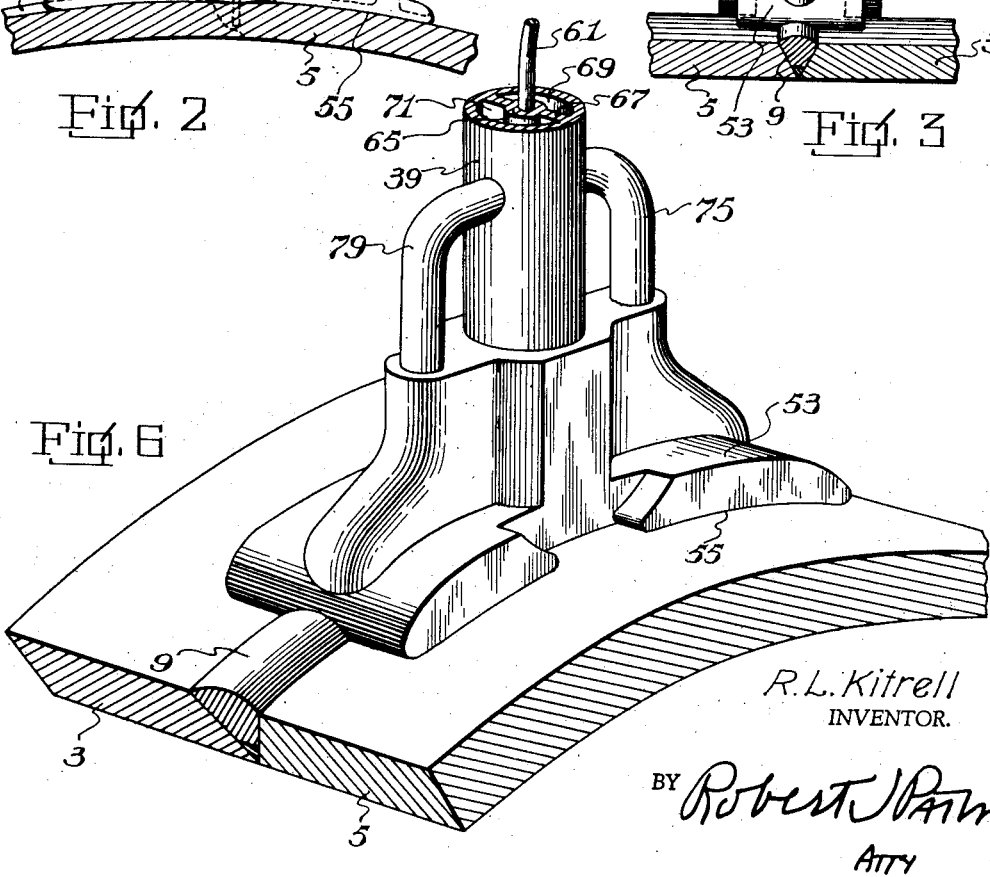
Figure 6 is an enlarged perspective view of the structure shown in section in Figure 5.

Referring now to the drawings in greater detail, there is shown generally at 1 an apparatus for welding joints between contiguous members, which in the illustrated embodiment are aligned cylindrical pipe sections 3 and 5 having beveled contiguous edges 7 for the reception and retention of a weld 9 therebetween. The apparatus is supported for revolution in either direction about the common axis of pipe sections 3 and 5 by means of the structure illustrated and described in copending application Serial No. 711,599 filed January 28, 1958, this structure being incorporated in the present application by reference so as to avoid useless repetition of the disclosure thereof.

There is thus provided a carriage including a bracket 11 which carries at its outer end a perpendicular arm 13 of channel cross section having a flat web 15 and a pair of flanges 17 extending generally radially inwardly toward the pipe sections. A line intersecting the axis of the pipe sections and perpendicular to the plane of web 15 would also intersect the mid-line of web 15.

Web 15 has a longitudinally extending elongated slot 19 therethrough; and an L-bracket 21 is slidably disposed on the upper surface of web 15 and has a vertical leg 23 and a horizontal leg 25 relative to web 15 when web 15 itself is horizontal. A clamping plate 27 parallel to leg 25 is slidably disposed on the radially inner side of web 15 and a bolt having a clamping wing nut 29 extends through plate 27, slot 19 and leg 25 releasably to clamp web 15 between leg 25 and plate 27 so as selectively to lock bracket 21 and the parts carried thereby in any of a plurality of positions along a path parallel to the axis of the pipe sections.

There is a hole through leg 23 of bracket 21 for receiving the screw-threaded stud of a clamping collar 31 held on by a wing nut 33 for easy assembly and disassembly. Collar 31 is of the split ring type which is operable to clamp or unclamp by manipulation of a wing nut 35.

A cylindrical sleeve 37 is mounted in collar 31. When sleeve 37 is clamped in collar 31, sleeve 37 cannot move relative to the carriage; but when collar 31 is released, then sleeve 37 is free to rotate relative to the carriage and to slide axially within collar 31. The axis of sleeve 37 coincides with a radius of the pipe sections. Sleeve 37 is open at its top and bottom and axially slidably but non-rotatably carries within it a coaxial cylindrical barrel 39. Barrel 39 slides within an annular abutment shoulder 41 on the interior of sleeve 37 and is provided with spaced coaxial annular abutment shoulders 43 and 45 at its upper end and intermediate its length, respectively, which slide within sleeve 37 on opposite sides of shoulder 41. A coil compression spring 47 surrounds barrel 39 and acts between abutment shoulders 41 and 45 continuously to urge barrel 39 and the parts carried thereby radially inwardly as a unitary assembly. In order to prevent rotation of this unitary assembly about the axis of barrel 39, a pair of dog point screws 49 extends through shoulder 41 and into opposed longitudinally extending keyways 51 cut into the outer wall of barrel 39.

On its radially inner end, barrel 39 carries a ceramic shoe 53 of porcelain or other non-conductive material. Shoe 53 has an underside 55 which is cylindrically arcuate about the axis of the pipe sections and is elongated peripherally thereof. Recessed lengthwise of underside 55 is a groove 57 of arcuate cross-sectional configuration which is positionable along and opens toward the joint to be welded. Those portions of underside 55 on either side of groove 57 conform very closely to the contiguous contour of pipe sections 3 and 5.

Extending radially centrally through shoe 53 is a central opening 59 having an enlarged upper end and a reduced lower end. In the enlarged upper end is disposed the radially inner end of barrel 39 and in the reduced lower end is disposed the radially inner end of a welding wire or electrode 61 which continues on into groove 57 as seen in Figure 5.

At its end above sleeve 37 as seen in Figure 1, electrode 61 is encased in a flexible casing in the form of a cable 63 through which it is fed toward the welding area during the welding operation continuously by feed means which are quite conventional in this art and need not be illustrated. Moving toward the weld area, electrode 61 passes through a tubular central portion 65 which is supported coaxially within barrel 39 by a partition 67 extending on either side of central portion 65 to the tubular outer walls of barrel 39 so as not only to support portion 65 but also to divide the interior of barrel 39 into a pair of coextensive longitudinally extending separate ducts 69 and 71. The usual control cable 73 also leads into the top of sleeve 37.

Ducts 69 and 71 serve to pass an inert gas toward the welding area, and in the case of duct 69 the gas path includes an elbow conduit 75 extending laterally from the lower end of barrel 39 in communication with duct 69 and terminating at its other end at shoe 53 in communication with an opening 77 through shoe 53 which terminates in groove 57. Similarly, the gas path through duct 71 includes conduit 79 communicating between duct 71 and an opening 81 through shoe 53 terminating in groove 57.

An inert gas is supplied through duct 69 or 71 for introduction into groove 57 through opening 77 or 81. The inert gas may be helium, argon, carbon dioxide or other inert gas or mixture thereof, and may even contain a very small amount of oxygen for special applications and still be "inert" within the meaning of the art and this application. The gas is introduced through one or the other of openings 77 or 81, but not both, depending on the direction of travel of the welding device. Thus, if the device is traveling clockwise as seen in Figure 5, the inert gas is introduced through opening 77 but not through opening 81. In this way, air is purged from groove 57 a substantial distance in advance of the welding area so that there is a minimum of air infiltration to the welding area. Not only does shoe 53 mechanically shield the area of welding from the air, but also the positioning of openings 77 and 81 substantial distances on either side of opening 59 lengthwise of groove 57 assures the best utilization of the inert gas for shielding purposes. Since the shielding gas passes selectively through either of ducts 69 and 71, it is introduced into these ducts by separate conduits 83 and 85, respectively, provided upstream with a simple switching manifold (not shown) for selecting the conduit through which the gas will be sent.

Guide means for the spring urged unitary assembly are provided, comprising a pair of coaxial rollers 87 disposed one on either side of shoe 53 and hence on either side of weld 9. The rollers are carried by an inverted U-shaped yoke 89 having downwardly extending legs 91 between the lower ends of which the rollers are rotatably mounted. Legs 91 are joined at their upper ends by a crosspiece 93 having a central annular collar 95 through which set screws 97 extend to lock collar 95 on barrel 39 at any desired position of adjustment lengthwise of barrel 39. The common axis of rollers 87 is perpendicular to the axis of barrel 39 and parallel to the common axis of pipe sections 3 and 5. Rollers 87 are adapted to bear against and roll along pipe sections 3 and 5, and to this end the axis of barrel 39 intersects the common axis of rollers 87 so that the thrust exerted by spring 47 is transmitted through the points of contact between the rollers and the pipe sections with no tendency toward rocking movement of the parts relative to each other. Similarly, the location of the axis of barrel 39 between rollers 87 provides against rocking in the other direction. The purpose of rollers 87 is not only to provide for smooth and easy rolling contact of the unitary assembly relative to the pipe sections, but also to avoid excessive wear of shoe 53. Thus, the collar assembly of rollers 87 may be adjusted up and down on barrel 39 so that shoe 53 is entirely out of contact with pipe sections 3 or 5 or so that the shoe only lightly touches the pipe sections.

In either event, the important relationship is that an axis of thrust is defined which is the axis of barrel 39, and that the two points of roller contact lie substantial distances on either side of that axis of thrust in the plane which includes both the axis of thrust and the axis of the pipe sections, and that the shoe extends substantial distances on either side of that plane with the points of introduction of the shielding gas into the groove on the underside of the shoe disposed substantial distances on opposite sides of that plane.

The operation of the apparatus according to the present invention is as follows:

By manipulation of wing nuts 29 and 35 and set screws 97, the device is lined up into the operating position relative to the joint as shown in Figure 1. Assuming the weld direction to be clockwise as seen in Figure 5, shielding gas is sent through conduit 83, the arc is struck and with the electrode continuously advancing into the groove and the carriage revolving the welding operation proceeds. Preferably, the weld is started at the bottom of the joint and run up about the pipe sections. When the top of the joint is reached, the welding operation is discontinued and the carriage run down to the lowermost position and then up in the opposite direction about the other side. During this latter half of the operation, the flow of inert gas through opening 77 is discontinued and instead the gas passes through opening 81 which now precedes the electrode along the weld line. Thus, the independent paths for the inert gas are used alternately so as to avoid the necessity for bodily altering the adjustment of parts when it is desired to weld in different directions.

This is not to say that only half of shoe 53 is used at a given time depending on the direction of welding. As a matter of fact, both sides of shoe 53 are used at all times, the leading side serving as an atmosphere shield and a device for confining the inert gas in the welding area and the trailing side of the shoe serving as a means for forming and shaping the soft or molten weld metal to that cross-sectional configuration which will have optimum strength characteristics and for retaining the weld metal in that desired shape until the heat thereof has been sufficiently abstracted through adjacent portions of the pipe sections so that the weld metal is self-supporting by the time it emerges from beneath the shoe.

During the actual welding operation, the unitary assembly of barrel 39, shoe 53 and rollers 87 and their support has movement relative to the carriage only radially of the axis of the pipe sections, and even then to the extent necessary to accommodate irregularities such as might render weld 9 non-circular. Nevertheless, it should be noted that since these parts are all in unitary assembly, such relative radial movement will not affect the relationship of these parts relative to each other, so that the shoe and the rollers and the electrode holder provided in connection therewith will have a fixed relationship relative to each other throughout the operation. Of course, the electrode will be gradually consumed, but since it is continuously fed toward the weld a constant electrode orientation is maintained.

From a consideration of the foregoing, it will be obvious that all of the initially recited objects of the present invention have been achieved.

Although the present invention has been described in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

What is claimed is:

1. In apparatus for welding joints between contiguous members comprising a carriage and means mounting the carriage for movement along a joint to be welded between contiguous members, the improvement comprising a unitary assembly of guide means and a shoe and a welding electrode holder, the guide means being adapted to bear against at least one of the contiguous members, the shoe having a groove along the underside thereof, means mounting the unitary assembly on the carriage for limited movement relative to the carriage, and means yieldably urging the unitary assembly toward the joint to be welded to position the shoe contiguous to the joint.

2. The invention of claim 1, and means for introducing an inert gas into the groove of the shoe.

3. In apparatus for welding joints between contiguous members comprising a carriage and means mounting the carriage for movement along a joint to be welded between contiguous members, the improvement comprising a unitary assembly comprising a shoe and a welding electrode holder, the shoe having a groove along the underside thereof, means mounting the unitary assembly on the carriage for limited movement relative to the carriage, means yieldably urging the unitary assembly toward the joint to be welded to position the shoe contiguous to the joint, and means for introducing an inert gas into the groove of the shoe.

4. In apparatus for welding joints between contiguous members comprising a carriage and means mounting the carriage for movement along a joint to be welded between contiguous members, the improvement comprising a shoe supported by the carriage for movement contiguous to the joint, the shoe having a groove on the underside thereof positionable lengthwise of and opening toward the joint, the shoe having an opening therethrough terminating in the groove, means supported by the carriage for mounting a welding electrode with one end of the electrode extending through the opening and into the groove, and means for introducing an inert gas into the groove.

5. The invention of claim 4, in which the point of introduction of the inert gas is spaced forwardly along the groove from the opening in the welding direction.

6. In apparatus for welding joints between contiguous members comprising a carriage and means mounting the carriage for movement along a joint to be welded between contiguous members, the improvement comprising a shoe supported by the carriage for movement contiguous to the joint, the shoe having a groove on the underside thereof positionable lengthwise of and opening toward the joint, the shoe having a pair of openings therethrough terminating in the groove and spaced apart lengthwise of the groove, means for supporting a welding electrode with one end extending through one of the openings and into the groove, and means for introducing an inert gas into the groove through the other of the openings.

7. In apparatus for welding joints between contiguous aligned cylindrical pipe sections comprising a carriage and means supporting the carriage for revolution in either direction about the axis of the pipe sections, the improvement comprising a shoe supported by the carriage for movement contiguous to the joint, the shoe having an underside cylindrically arcuate about said axis, the underside of the shoe having an elongated groove therein arcuate about said axis, the shoe having three openings therethrough terminating in said groove and spaced apart lengthwise of the groove, means for supporting a welding electrode with one end extending through the central opening and into the groove, and means for introducing an inert gas into the groove through either of the other two openings.

8. In apparatus for welding joints between contiguous members comprising a carriage and means mounting the carriage for movement along a joint to be welded between contiguous members, the improvement comprising a unitary assembly of guide means and a shoe, the guide means comprising a pair of coaxial rollers one on either side of the shoe and adapted to bear against the contiguous members on either side of the joint, the shoe having a groove along and extending full length of the underside thereof and positionable lengthwise of and contiguous to and opening toward the joint and disposed in a plane perpendicular to the axis of the rollers, the shoe having a pair of openings therethrough terminating in the groove and spaced apart lengthwise of the groove, means for supporting a welding electrode with one end extending through one of the openings into the groove, means for introducing an inert gas into the groove through the other of the openings, means mounting the unitary assembly on the carriage for limited movement relative to the carriage, and means yieldably urging the unitary assembly toward the joint to be welded to position the shoe contiguous to the joint.

References Cited in the file of this patent

UNITED STATES PATENTS

| | | |
|---|---|---|
| 2,403,221 | Howard | July 2, 1946 |
| 2,441,551 | Anderson | May 18, 1948 |
| 2,677,036 | Meyer et al. | Apr. 27, 1954 |